United States Patent
Tran et al.

(10) Patent No.: US 10,154,428 B2
(45) Date of Patent: Dec. 11, 2018

(54) ANTENNA CONTROL METHOD AND NON-TRANSITORY COMPUTER-READABLE MEDIUM THEREOF

(71) Applicant: Wistron NeWeb Corp., Hsinchu (TW)

(72) Inventors: Jimmy Cuong Tran, Hsinchu (TW); Yung-Liang Huang, Hsinchu (TW); Ta Chen, Hsinchu (TW); Chih-Wei Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 69 days.

(21) Appl. No.: 15/480,169

(22) Filed: Apr. 5, 2017

(65) Prior Publication Data

US 2018/0007573 A1 Jan. 4, 2018

(30) Foreign Application Priority Data

Jun. 30, 2016 (TW) .............................. 105120715 A

(51) Int. Cl.
*G08C 15/00* (2006.01)
*H04W 24/08* (2009.01)
*H04L 5/00* (2006.01)
*H04W 16/28* (2009.01)
*H04W 72/04* (2009.01)
*H04W 72/08* (2009.01)

(52) U.S. Cl.
CPC .......... *H04W 24/08* (2013.01); *H04L 5/0048* (2013.01); *H04W 16/28* (2013.01); *H04W 72/046* (2013.01); *H04W 72/085* (2013.01)

(58) Field of Classification Search
CPC . H04W 24/08; H04W 72/085; H04W 72/046; H04W 16/28; H04L 5/0048
USPC ........................................................ 370/252
See application file for complete search history.

(56) References Cited

U.S. PATENT DOCUMENTS

| 7,353,001 B1 | 4/2008 | Ngan |
| 7,460,834 B2 | 12/2008 | Johnson et al. |
| 8,265,552 B2 | 9/2012 | Kamel et al. |
| 2005/0202859 A1* | 9/2005 | Johnson ............... H04B 7/0408 455/575.7 |
| 2016/0150435 A1* | 5/2016 | Baek .................... H04W 16/28 370/252 |

* cited by examiner

*Primary Examiner* — Mang Hang Yeung
(74) *Attorney, Agent, or Firm* — McClure, Qualey & Rodack, LLP

(57) ABSTRACT

An antenna control method for controlling an antenna device to switch between a plurality of beams. The antenna control method includes the steps of: (a) using the beams for communication one after another, and performing a scanning process on each of the beams, so as to retrieve a communication quality parameter; (b) comparing all of the communication quality parameters with each other, and selecting one of the beams as a main communication beam, wherein the selected beam has the best communication quality parameter; (c) performing a saturation determination process on the main communication beam; and (d) when the main communication beam causes saturation of a power amplifier, switching to another beam which is adjacent to the main communication beam as a substitute communication beam.

16 Claims, 9 Drawing Sheets

ANTENNA CONTROL METHOD AND NON-TRANSITORY COMPUTER-READABLE MEDIUM THEREOF

CROSS REFERENCE TO RELATED APPLICATIONS

This Application claims priority of Taiwan Patent Application No. 105120715 filed on Jun. 30, 2016, the entirety of which is incorporated by reference herein.

BACKGROUND OF THE INVENTION

Field of the Invention

The disclosure generally relates to an antenna control method, and more particularly to an antenna control method for automatic selection of the best beam.

Description of the Related Art

With advancements in mobile communication technology, mobile devices such as portable computers, mobile phones, multimedia players, and other hybrid functional portable electronic devices have become more common. To satisfy consumer demands, mobile devices can usually perform wireless communication functions. Some devices cover a large wireless communication area; these include mobile phones using 2G, 3G, and LIE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

Communication devices with smart antennas allow mobile devices in the room to connect to the Internet at a high speed. Generally, smart antennas can switch between multiple beams. However, it has become a critical challenge for antenna designers to design a standard process for controlling smart antennas, which can automatically select the best beam for wireless communication.

BRIEF SUMMARY OF THE INVENTION

In a preferred embodiment, the invention is directed to an antenna control method for controlling an antenna device to switch between a plurality of beams. The antenna control method includes the steps of: (a) using the beams for communication one after another, and performing a scanning process on each of the beams, so as to retrieve a communication quality parameter; (b) comparing all of the communication quality parameters with each other, and selecting one of the beams as a main communication beam, wherein the selected beam has the best communication quality parameter; (c) performing a saturation determination process on the main communication beam; and (d) when the main communication beam causes saturation of a power amplifier, switching to another beam which is adjacent to the main communication beam as a substitute communication beam.

In some embodiments, the scanning process of step (a) includes: measuring a plurality of communication sample values of the corresponding beam at intervals; during a preset time period, continuously calculating a plurality of moving average values of the respective communication sample values; averaging the moving average values of the respective communication sample values, so as to obtain a plurality of final average values corresponding to the respective communication sample values; and using the final average values as the communication quality parameter of the corresponding beam.

In some embodiments, each of the communication quality parameters includes RSRP (Reference Signal Received Power), RSRQ (Reference Signal Received Quality), and SINR (Signal to Interference-plus-Noise Ratio).

In some embodiments, step (b) further includes: comparing the RSRP of each of the communication quality parameters with a first threshold value; if at least one RSRP of the communication quality parameters is not lower than the first threshold value, selecting one of the beams as the main communication beam, wherein the selected beam has the best RSRP; and if all of the RSRPs of the communication quality parameters are lower than the first threshold value, selecting one of the beams as the main communication beam, wherein the selected beam has the best RSRQ.

In some embodiments, the saturation determination process of step (c) includes: during a predetermined time period, measuring a plurality of communication sample values of the main communication beam at intervals; continuously calculating a plurality of moving average values of the communication sample values; averaging the moving average values, so as to obtain a final average value; and using the final average value as a saturation condition parameter of the main communication beam.

In some embodiments, the saturation condition parameter includes RSRP (Reference Signal Received Power), and SINR (Signal to Interference-plus-Noise Ratio).

In some embodiments, the saturation determination process of step (c) further includes: comparing the RSRP of the saturation condition parameter with a second threshold value; comparing the SINR of the saturation condition parameter with a third threshold value; if the RSRP of the saturation condition parameter is higher than or equal to the second threshold value, and the SINR of the saturation condition parameter is lower than or equal to the third threshold value, determining that the main communication beam causes the saturation of the power amplifier; and if the RSRP of the saturation condition parameter is lower than the second threshold value, or the SINR of the saturation condition parameter is higher than the third threshold value, determining that the main communication beam does not cause the saturation of the power amplifier.

In some embodiments, the antenna control method further includes: (e) performing the saturation determination process and a strength determination process on the substitute communication beam.

In some embodiments, the antenna control method further includes: (f) if the substitute communication beam is too weak, or causes the saturation of the power amplifier, using the main communication beam again, instead of the substitute communication beam.

In some embodiments, the saturation determination process and the strength determination process of step (e) include: during a predetermined time period, measuring a plurality of communication sample values of the substitute communication beam at intervals; continuously calculating a plurality of moving average values of the communication sample values; averaging the moving average values, so as to obtain a final average value; and using the final average value as a saturation condition parameter and a strength condition parameter of the substitute communication beam.

In some embodiments, the saturation condition parameter and the strength condition parameter include RSRP (Reference Signal Received Power), and SINR (Signal to Interference-plus-Noise Ratio).

In some embodiments, the strength determination process of step (e) includes: comparing the RSRP of the strength condition parameter with a fourth threshold value; if the RSRP of the strength condition parameter is lower than the fourth threshold value, determining that the substitute communication beam is too weak; and if the RSRP of the strength condition parameter is higher than or equal to the fourth threshold value, determining that the substitute communication beam has sufficient strength.

In some embodiments, the saturation determination process of step (e) further includes: comparing the RSRP of the saturation condition parameter with a second threshold value; comparing the SINR of the saturation condition parameter with a third threshold value; if the RSRP of the saturation condition parameter is higher than or equal to the second threshold value, and the SINR of the saturation condition parameter is lower than or equal to the third threshold value, determining that the substitute communication beam causes the saturation of the power amplifier; and if the RSRP of the saturation condition parameter is lower than the second threshold value, or the SINR of the saturation condition parameter is higher than the third threshold value, determining that the substitute communication beam does not cause the saturation of the power amplifier.

In some embodiments, the antenna control method further includes: (g) when step (c), step (d), step (e), and step (f) have all been completed, during a freezing time period, not switching between the main communication beam and the substitute communication beam.

In some embodiments, the antenna control method further includes: (h) resetting and then performing step (a), step (b), step (c), step (d), step (e), and step (f) at intervals of a cycle time period.

In another preferred embodiment, the invention is directed to a non-transitory computer-readable medium storing a computer program product operable to control a communication device to perform the operations of: (a) using a plurality of beams of an antenna device for communication one after another, and performing a scanning process on each of the beams, so as to retrieve a communication quality parameter; (b) comparing all of the communication quality parameters, and selecting one of the beams as a main communication beam, wherein the selected beam has the best communication quality parameter; (c) performing a saturation determination process on the main communication beam; and (d) when the main communication beam causes saturation of a power amplifier, switching to another beam which is adjacent to the main communication beam as a substitute communication beam.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
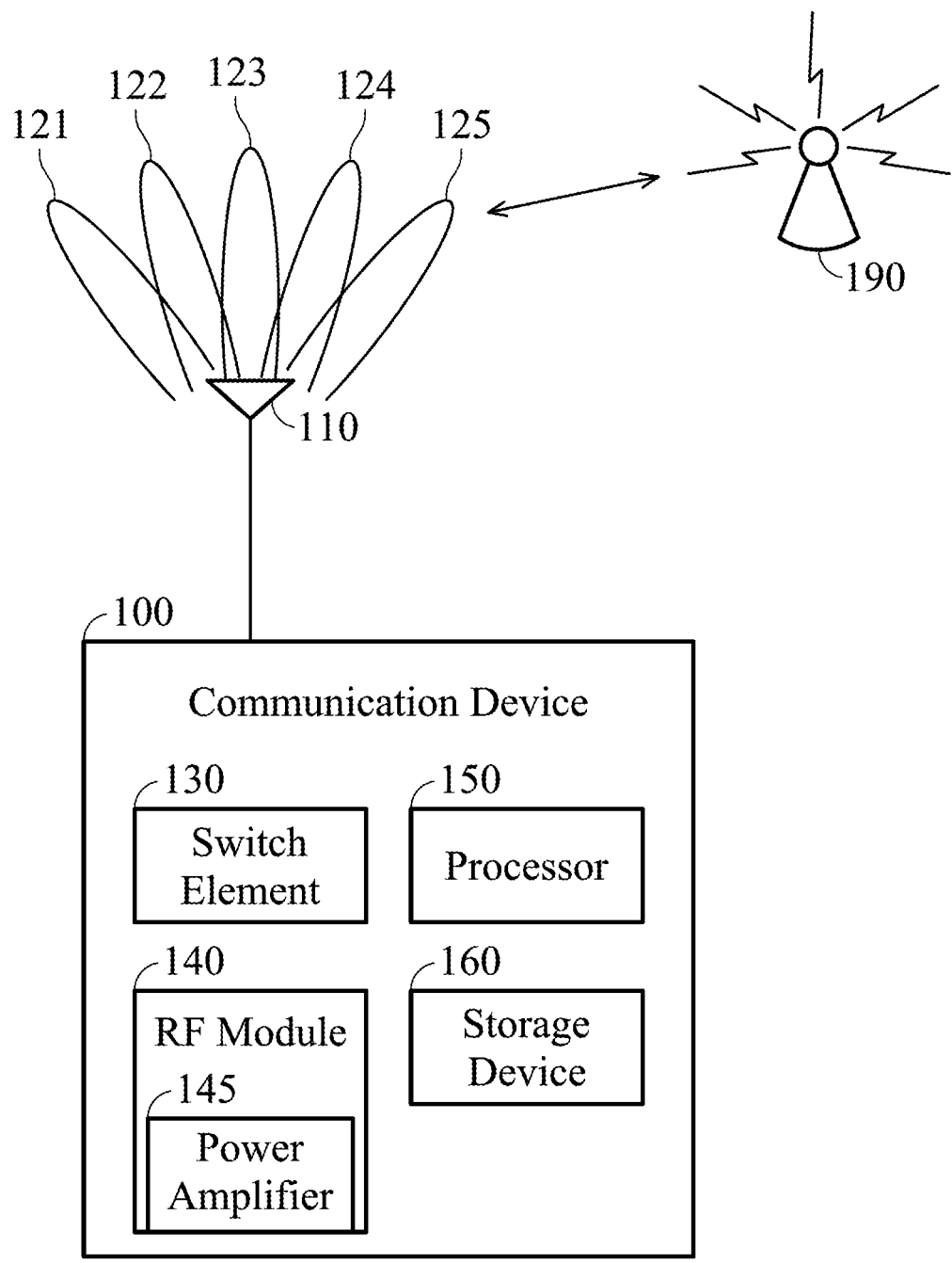
FIG. 1 is a diagram of a communication device according to an embodiment of the invention.

FIG. 1 is a diagram of a communication device 100 according to an embodiment of the invention. As shown in FIG. 1, the communication device 100 includes an antenna device 110, a switch element 130, an RF (Radio Frequency) module 140, a processor 150, and a storage device 160. The antenna device 110 may be a smart antenna, which is capable of emitting a plurality of beams 121, 122, 123, 124, and 125. The switch element 130 may be an RF switch module. By using the switch element 130, the antenna device 110 can switch between the beams 121, 122, 123, 124, and 125. For example, if the switch element 130 selects the beam 122, the antenna device 110 will use only the beam 122 to wirelessly communicate with a nearby base station 190, and if the switch element 130 selects the beam 125, the antenna device 110 will use only the beam 125 to wirelessly communicate with the base station 190. Since the beams 121, 122, 123, 124, and 125 are facing different directions, the antenna device 110 can use them to receive and transmit wireless signals in a variety of directions. It should be noted that although there are exactly five beams 121, 122, 123, 124, and 125 displayed in the antenna device 110 of FIG. 1, in other embodiments, the antenna device 110 may have more or fewer beams in different directions. In addition, the communication device 100 may further include other components, such as an operation interface, a housing, an antenna mask, and a power supply module, but they are not shown in FIG. 1.

The RF module 140 may be a transceiver, and it can generate a transmission signal to the antenna device 110 or process a reception signal from the antenna device 110. The RF module 140 may include a power amplifier 145. The processor 150 may include any custom-made or commercially available processor, a central processing unit (CPU), an auxiliary processor, a semiconductor-based microprocessor, a macro-processor, one or more application specific integrated circuits (ASICs), a plurality of suitably configured digital logic gates, or other well known electrical configurations including discrete elements both individually and in various combinations to coordinate the overall operation of the computing system. The storage device 160 can include any one of a combination of volatile memory elements (e.g., random-access memory (RAM, such as DRAM, and SRAM, etc.)) or nonvolatile memory elements. In some embodiments, the storage device 160 can store computer software. The processor 150 is configured to execute the computer software stored in the storage device 160, and control the antenna device 110, the switch element 130, and the RF module 140 to perform the method steps of the invention.

The following embodiments and figures are used to describe the antenna control method of the invention, and they can be performed by the communication device 100 of FIG. 1. It should be understood that these embodiments and figures are just exemplary, rather than limitations of the invention.

Figure 2:
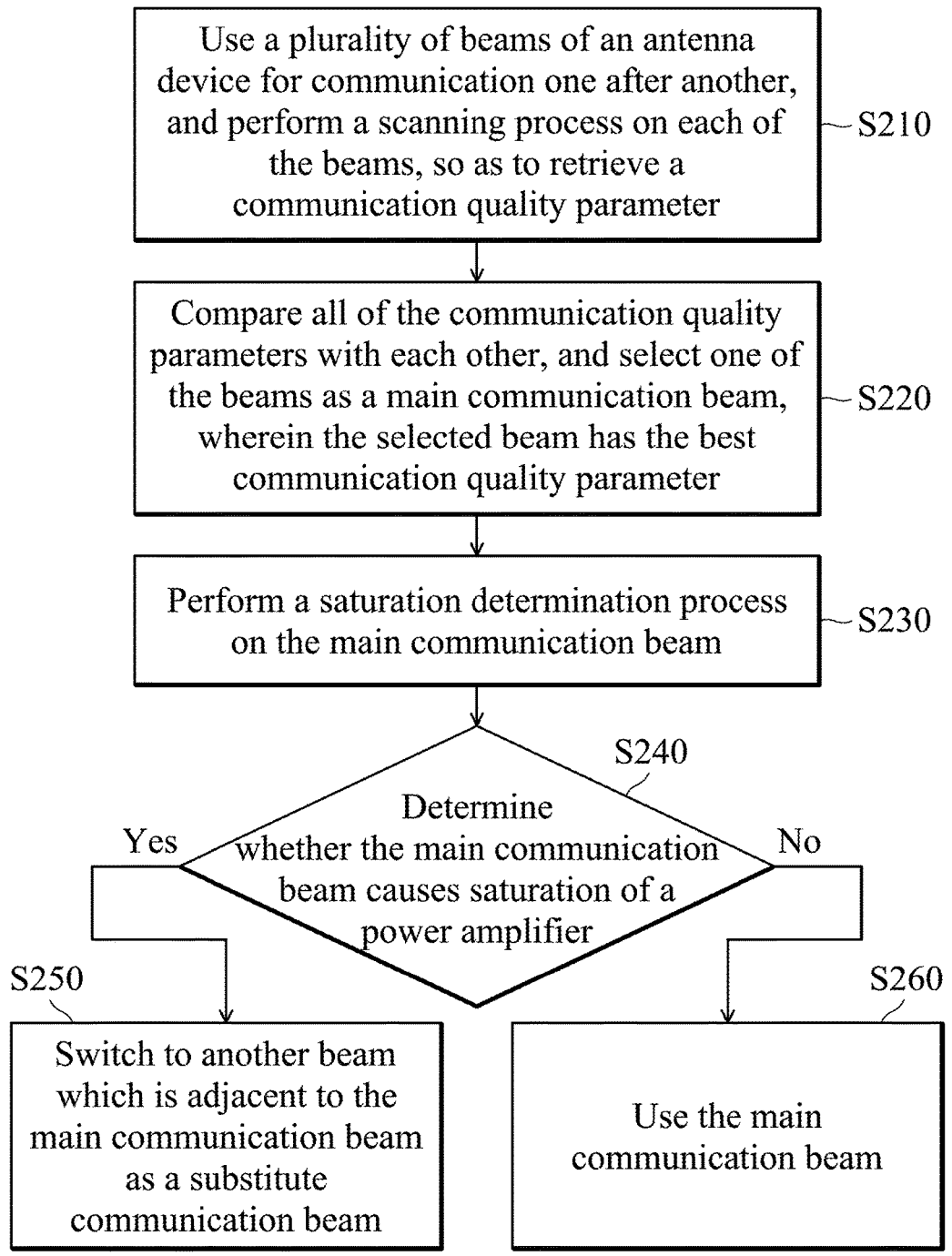
FIG. 2 is a flowchart of an antenna control method according to an embodiment of the invention.

FIG. 2 is a flowchart of an antenna control method according to an embodiment of the invention. The antenna control method can control an antenna device to switch between a plurality of beams. To begin, in step S210, the beams are used for communication one after another, and a scanning process is performed on each of the beams, so as to retrieve a communication quality parameter. In some embodiments, the communication quality parameter indicates the measured and scanned signal communication quality when the antenna device uses the corresponding beam to receive a signal from a nearby base station. For example, each of the communication quality parameters includes RSRP (Reference Signal Received Power), RSRQ (Reference Signal Received Quality), and SINR (Signal to Interference-plus-Noise Ratio). In step S220, all of the communication quality parameters are compared with each other, and one of the beams is selected as a main communication beam. The selected beam has the best communication quality parameter. In step S230 and step S240, a saturation determination process is performed on the main communication beam. When the main communication beam causes saturation of a power amplifier (step S240, yes), in step S250, another beam which is adjacent to the main communication beam is switched to and used as a substitute communication beam. The main communication beam is replaced with the substitute communication beam for communication. For example, referring to the embodiment of FIG. 1, if the main communication beam is beam 123, another beam which is adjacent to the main communication beam may be beam 122 or 124. The other substitute communication beam may be selected in a similar way. Conversely, if the main communication beam does not cause saturation of the power amplifier (step S240, no), in step S260, the original main communication beam will be still used for communication.

The embodiment of FIG. 2 shows an antenna control method which prevents reception signals that are too strong from causing the power amplifier to enter the saturation region. When the use of the main communication beam results in the saturation of the power amplifier, it implies that the use of the adjacent beams for wireless communication can also lead to good communication quality (because the main communication beam and its adjacent beams may all be facing the direction of the base station). Therefore, the re-selection operation of step S250 not only avoids the saturation of the power amplifier, but also automatically switches to another appropriate beam, so as not to affect the whole communication quality so much.

Figure 3:
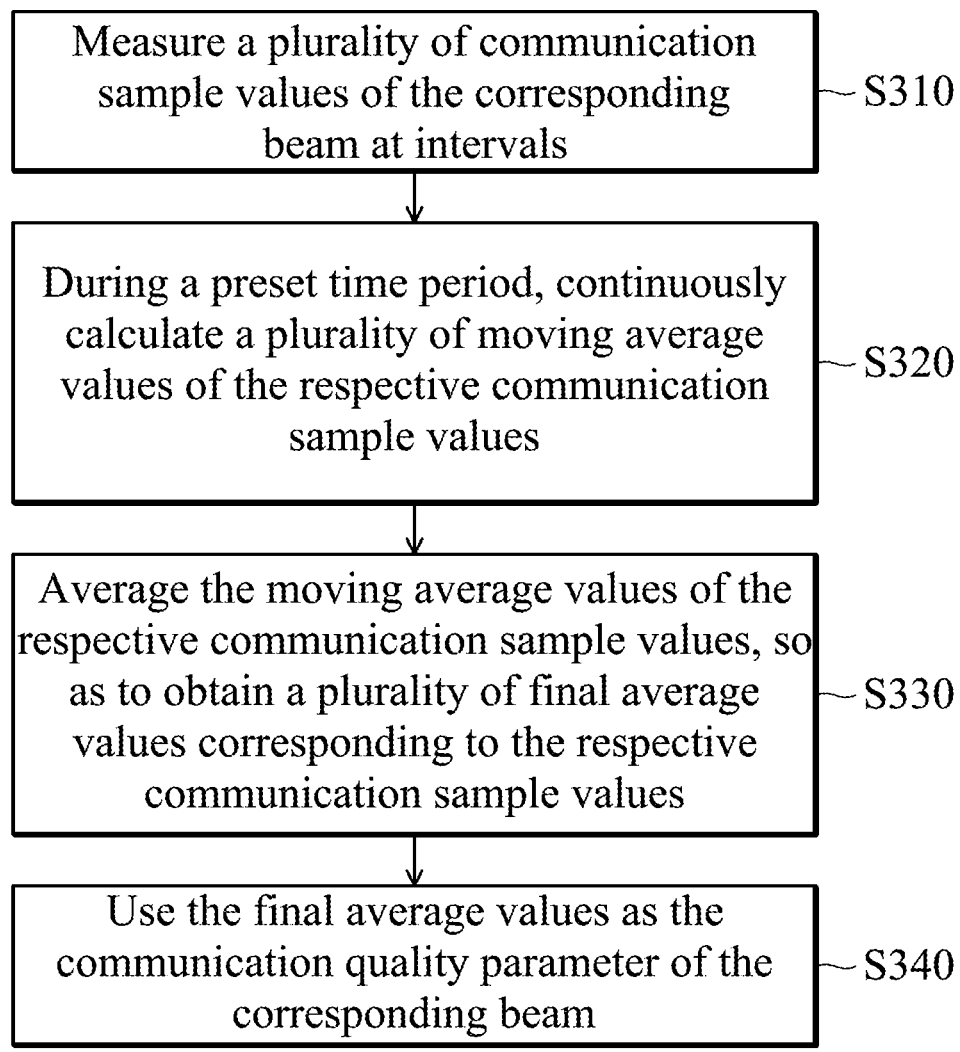
FIG. 3 is a flowchart of a scanning process of some steps of an antenna control method according to an embodiment of the invention.

FIG. 3 is a flowchart of the scanning process of step S210 of the antenna control method according to an embodiment of the invention. In step S310, a plurality of communication sample values of the corresponding beam are measured at intervals. For example, the communication sample values may be measured at intervals of 1 second. In step S320, during a preset time period, a plurality of moving average values of the respective communication sample values are continuously calculated. In step S330, the moving average values of the respective communication sample values are averaged, so as to obtain a plurality of final average values corresponding to the respective communication sample values. In step S340, the final average values are used as the communication quality parameter of the corresponding beam.

For example, over the time axis, the received N communication sample values may be data DA1, DA2, . . . , and DAN in order and in linear scale. If each moving average value is calculated by averaging respective continuous M communication sample values, it will generate (N−M+1) moving average values AV1, AV2, . . . , and AV(N−M+1). The moving average value AV1 is an average value of the data DA1 to DAM in linear scale, the moving average value AV2 is an average value of the data DA2 to DA(M+1) in linear scale, . . . , and the moving average value AV(N−M+1) is an average value of the data DA(N−M+1) to DAN in linear scale. The final average value FAV is an average value of the (N−M+1) moving average values AV1, AV2, . . . , and AV(N−M+1), and it is considered as the aforementioned communication quality parameter. The above N and M are positive integers, and M is smaller than or equal to N. In some embodiments, each of the communication sample values includes a sample value of RSRP (Reference Signal Received Power), a sample value of RSRQ (Reference Signal Received Quality), and a sample value of SINR (Signal to Interference-plus-Noise Ratio). The twice-averaging calculation method of the embodiment of FIG. 3 can prevent some extreme values from affecting the measurement of the communication quality parameter.

Figure 4:
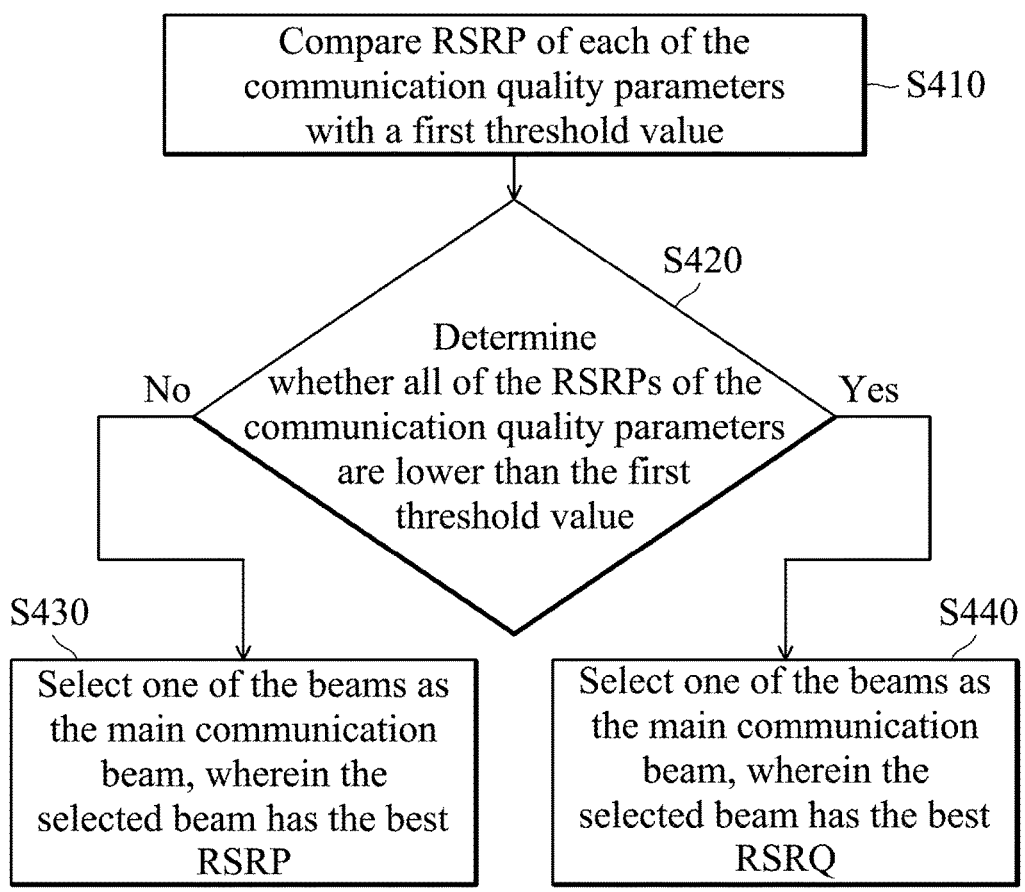
FIG. 4 is a flowchart of some steps of an antenna control method according to an embodiment of the invention.

FIG. 4 is a flowchart of step S220 of the antenna control method according to an embodiment of the invention. In step S410 and step S420, the RSRP of each of the communication quality parameters is compared with a first threshold value. For example, the first threshold value may be −108 dBm. If at least one RSRP of the communication quality parameters is not lower than the first threshold value (step S420, no), in step S430, one of the beams will be selected as the main communication beam, and the selected beam may have the best RSRP. If all of the RSRPs of the communication quality parameters are lower than the first threshold value (step S420, yes), in step S440, one of the beams will be selected as the main communication beam, and the selected beam may have the best RSRQ. The pre-determination process of the embodiment of FIG. 4 can avoid the selection of the main communication beam according to an RSRP that is too low.

Figure 5:
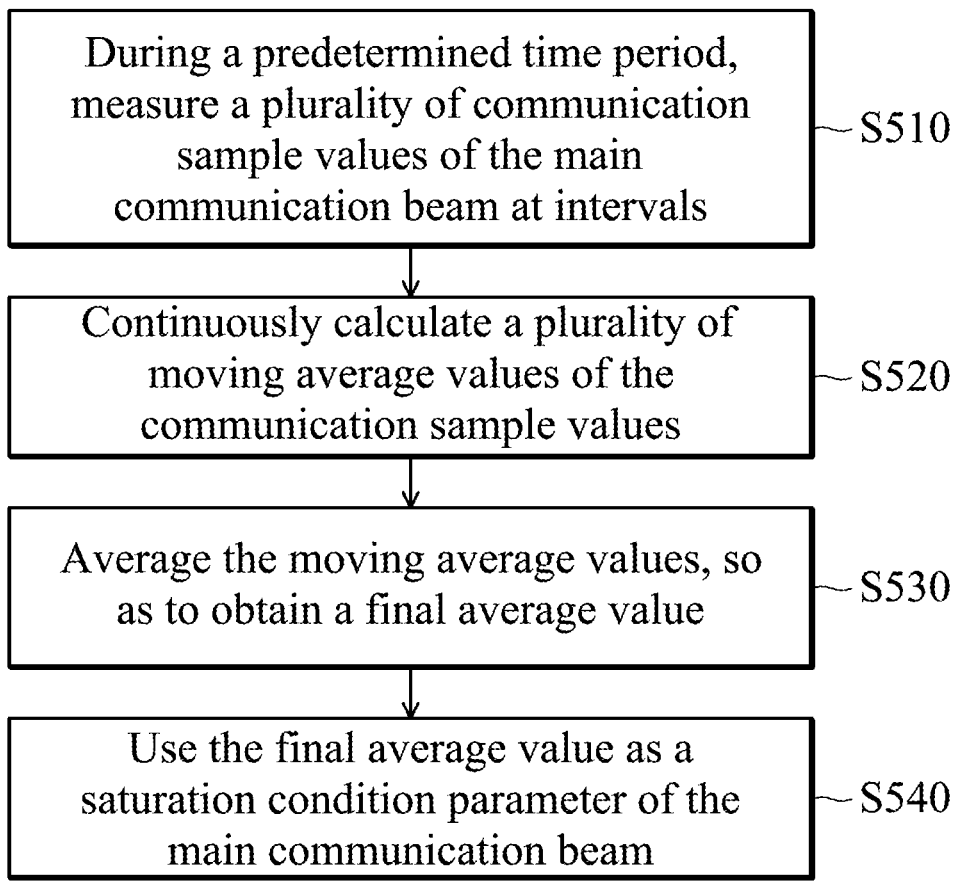
FIG. 5 is a flowchart of a saturation determination process of some steps of an antenna control method according to an embodiment of the invention.

FIG. 5 is a flowchart of the saturation determination process of step S230 and step S240 of the antenna control method according to an embodiment of the invention. In step S510, during a predetermined time period, a plurality of communication sample values of the main communication beam are measured at intervals. For example, the predetermined time period may be 120 seconds, and the communication sample values may be measured at intervals of 1 second. In step S520, a plurality of moving average values of the communication sample values are continuously calculated. In step S530, the moving average values are averaged, so as to obtain a final average value. In step S540, the final average value is used as a saturation condition parameter of the main communication beam. For example, the saturation condition parameter may include RSRP (Reference Signal Received Power), and SINR (Signal to Interference-plus-Noise Ratio).

For the embodiment of FIG. 5, over the time axis, the received N communication sample values may be data DA1, DA2, . . . , and DAN in order and in linear scale. If each moving average value is calculated by averaging respective continuous M communication sample values, it will generate (N−M+1) moving average values AV1, AV2, . . . , and AV(N−M+1). The moving average value AV1 is an average value of the data DA1 to DAM in linear scale, the moving average value AV2 is an average value of the data DA2 to DA(M+1) in linear scale, . . . , and the moving average value AV(N−M+1) is an average value of the data DA(N−M+1) to DAN in linear scale. The final average value FAV is an average value of the (N−M+1) moving average values AV1, AV2, . . . , and AV(N−M+1), and it is considered as the aforementioned saturation condition parameter. The above N and M are positive integers, and M is smaller than or equal to N. In the embodiment of FIG. 5, N may be set to 120, and M may be set to 5. It should be understood that the number N of the communication sample values and the number M of samples of each moving average value in the above example are both adjustable. In some embodiments, each of the communication sample values includes a sample value of RSRP (Reference Signal Received Power), and a sample value of SINR (Signal to Interference-plus-Noise Ratio). The twice-averaging calculation method of the embodiment of FIG. 5 can prevent some extreme values from affecting the measurement of the saturation condition parameter.

Figure 6:
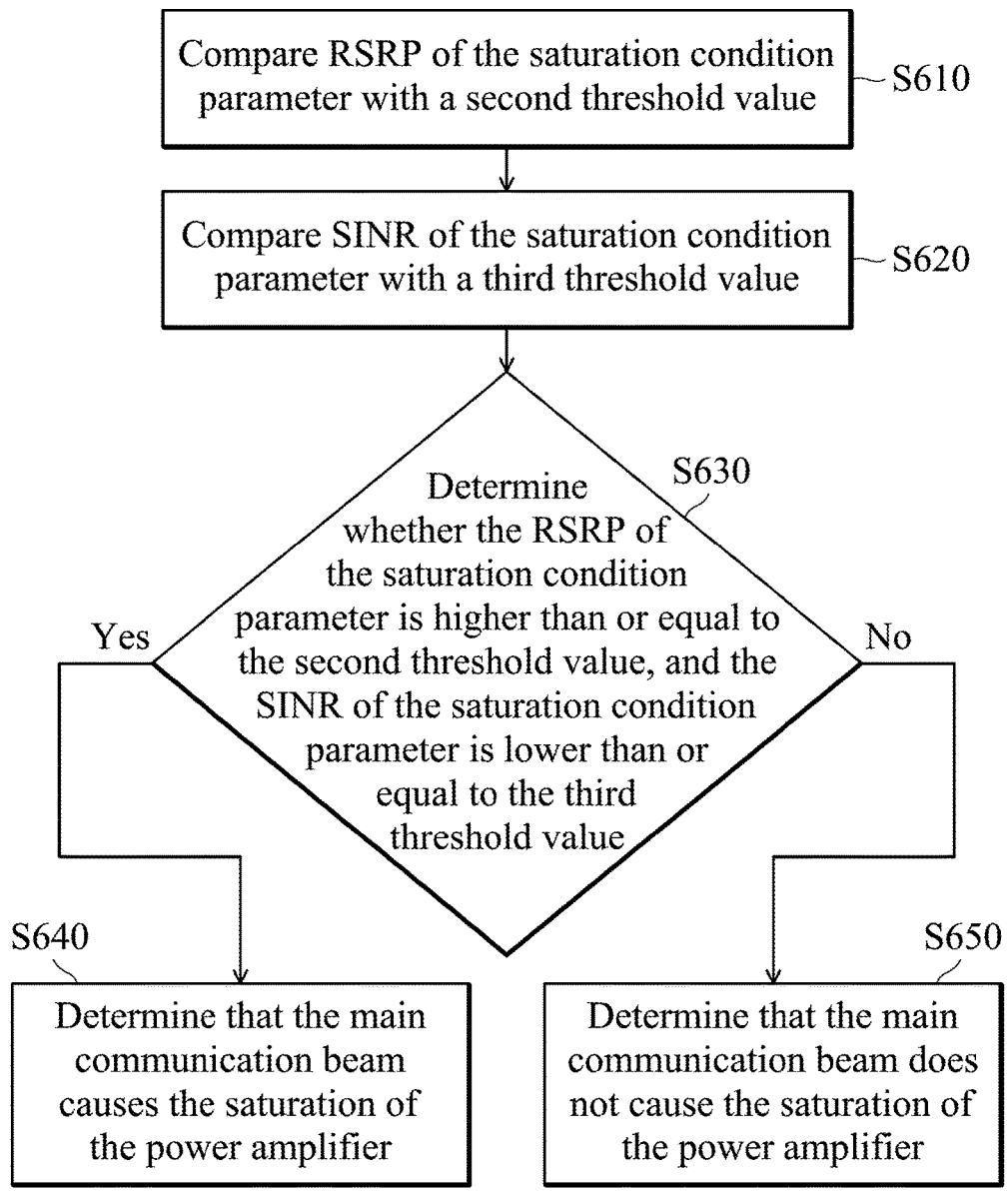
FIG. 6 is a flowchart of a saturation determination process of some steps of an antenna control method according to an embodiment of the invention.

FIG. 6 is a flowchart of the saturation determination process of step S230 and step S240 of the antenna control method according to an embodiment of the invention. In step S610, the RSRP of the saturation condition parameter is compared with a second threshold value. In step S620, the SINR of the saturation condition parameter is compared with a third threshold value. For example, the second threshold value may be −43 dBm, and the third threshold value may be 23 dB. If the RSRP of the saturation condition parameter is higher than or equal to the second threshold value, and the SINR of the saturation condition parameter is lower than or equal to the third threshold value (step S630, yes), in step S640, it will be determined that the main communication beam causes the saturation of the power amplifier. If the RSRP of the saturation condition parameter is lower than the second threshold value, or the SNR of the saturation condition parameter is higher than the third threshold value (step S630, no), in step S650, it will be determined that the main communication beam does not cause the saturation of the power amplifier. The determination of the embodiment of FIG. 6 is based on both RSRP and SNR, thereby reducing the probability of misjudgment.

Figure 7:
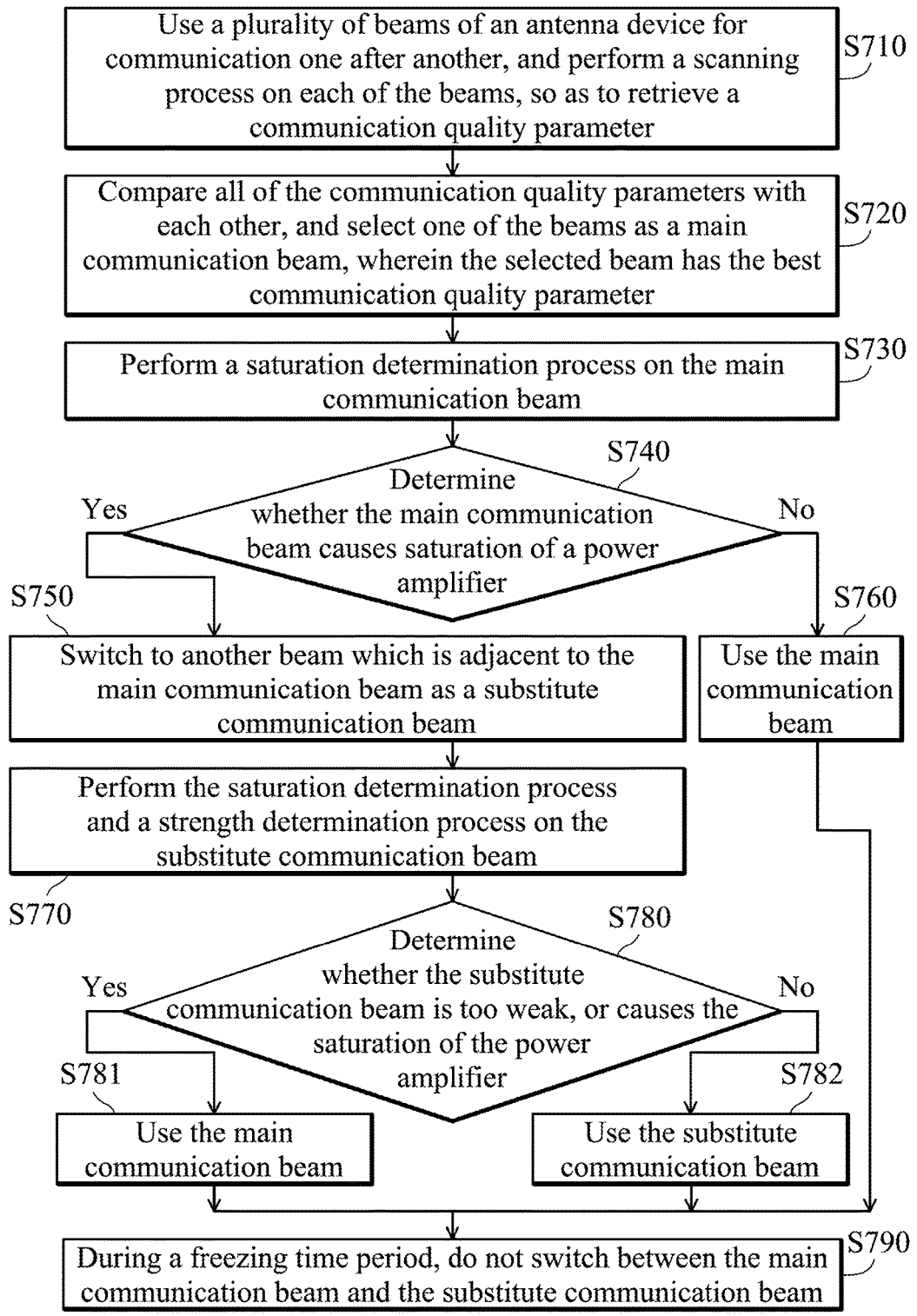
FIG. 7 is a flowchart of an antenna control method according to an embodiment of the invention.

FIG. 7 is a flowchart of an antenna control method according to an embodiment of the invention. The antenna control method can control an antenna device to switch between a plurality of beams. Steps S710 to S760 of FIG. 7 are the same as steps S210 to S260 of FIG. 2. The difference between the two embodiments is that the antenna control method of FIG. 7 further includes steps S770 to S790. In step S770 and step S780, the saturation determination process and a strength determination process are performed on the substitute communication beam. Specifically, referring to the embodiment of FIG. 1, if the main communication beam is beam 123, another beam which is adjacent to the main communication beam may be beam 122 or 124, and step S770 and step S780 may include performing the saturation determination process and the strength determination process on both of the beams 122 and 124. If the substitute communication beam is too weak, or causes saturation of the power amplifier (step S780, yes), in step S781, the main communication beam will used again for communication, instead of the substitute communication beam. If the substitute communication beam has sufficient strength and does not cause the saturation of the power amplifier (step S780, no), in step S782, the substitute communication beam will be still used for communication, instead of the main communication beam.

Step S770 of performing the saturation determination process and the strength determination process on the substitute communication beam is similar to the flowcharts of FIG. 5 and FIG. 6. Please refer to FIG. 5 and FIG. 6 to understand it further. To begin, during a predetermined time period (e.g., 120 seconds), a plurality of communication sample values of the substitute communication beam are measured at intervals (e.g., at intervals of 1 second). Next, a plurality of moving average values of the communication sample values are continuously calculated. Then, the moving average values are averaged, so as to obtain a final average value. Finally, the final average value is used as a saturation condition parameter and a strength condition parameter of the substitute communication beam. For example, the saturation condition parameter and the strength condition parameter may include RSRP (Reference Signal Received Power), and SINR (Signal to Interference-plus-Noise Ratio).

In some embodiments, the saturation determination process further includes the following steps. To begin, the RSRP of the saturation condition parameter is compared with a second threshold value. Next, the SINR of the saturation condition parameter is compared with a third threshold value. For example, the second threshold value may be −43 dBm, and the third threshold value may be 23 dB. If the RSRP of the saturation condition parameter is higher than or equal to the second threshold value, and the SINR of the saturation condition parameter is lower than or equal to the third threshold value, it will be determined that the main communication beam causes the saturation of the power amplifier. If the RSRP of the saturation condition parameter is lower than the second threshold value, or the SINR of the saturation condition parameter is higher than the third threshold value, it will be determined that the main communication beam does not cause the saturation of the power amplifier.

Figure 8:
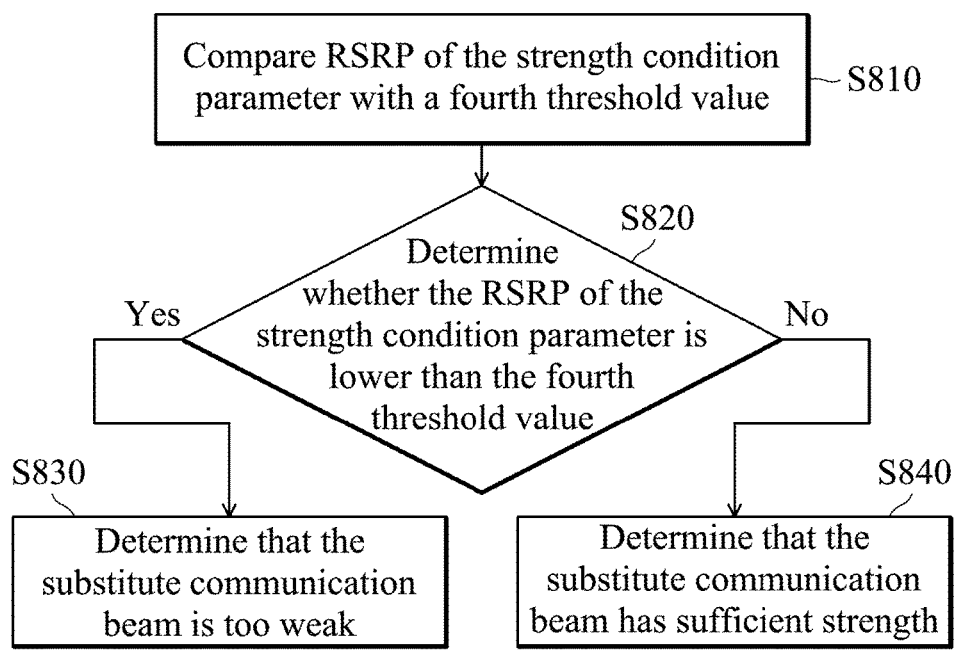
FIG. 8 is a flowchart of a strength determination process of some steps of an antenna control method according to an embodiment of the invention.

FIG. 8 is a flowchart of the strength determination process of step S770 and step S780 of the antenna control method according to an embodiment of the invention. In step S810 and step S820, the RSRP of the strength condition parameter is compared with a fourth threshold value. For example, the fourth threshold value may be −50 dBm. If the RSRP of the strength condition parameter is lower than the fourth threshold value (step S820, yes), in step S830, it will be determined that the substitute communication beam is too weak.

If the RSRP of the strength condition parameter is higher than or equal to the fourth threshold value (step S820, no), in step S840, it will be determined that the substitute communication beam has sufficient strength.

Please refer to FIG. 7 again. In step S790, when steps S730 to S782 have been all completed (the result may be either the steps of S760 or S781 of selecting the main communication beam for communication, or step S782 of selecting the substitute communication beam for communication), during a freezing time period, there will be no operation of switching between the main communication beam and the substitute communication beam. For example, the freezing time period may be set to 30 minutes. The embodiment of FIG. 7 can avoid the ping-pong effect. That is, such a design is arranged for reducing the probability of the antenna device frequently switching between the main communication beam and the substitute communication beam. In some embodiments, when the freezing time period expires, the saturation determination process of steps S740 to S782 may be performed again. In alternative embodiments, the antenna control method of FIG. 7 further includes periodically performing a maintaining scanning process. The maintaining scanning process includes resetting (stopping) any current operation and then performing steps S710 to S782 at intervals of a cycle time period. For example, the cycle time period may be set to 2 or 3 hours or any fixed time period.

Figure 9:
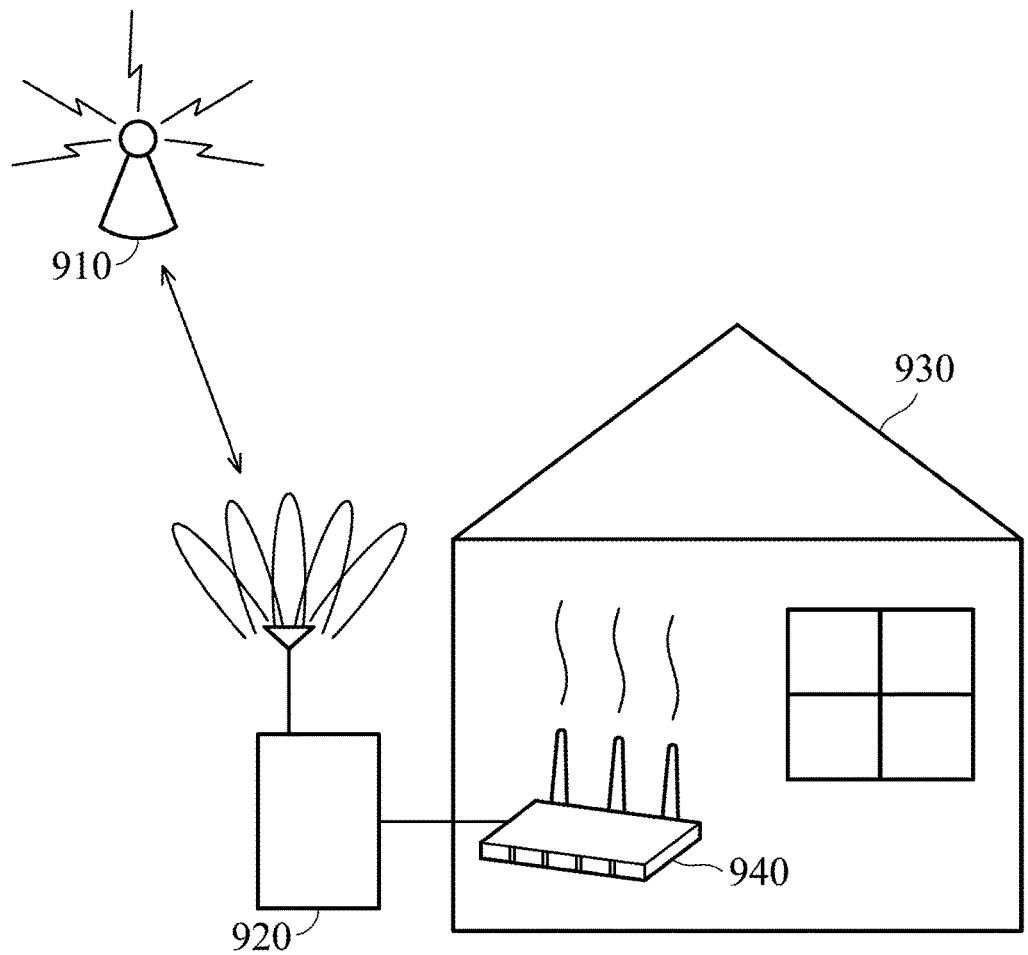
FIG. 9 is a diagram of application of a communication device according to an embodiment of the invention.

FIG. 9 is a diagram of application of a communication device 920 according to an embodiment of the invention. The structure and function of the communication device 920 have been described in the embodiments of FIG. 1 to FIG. 8. In the embodiment of FIG. 9, the communication device 920 is an outdoor unit (ODU), and it can wirelessly communicate with a nearby base station 910. The base station 910 may be used for a mobile communication network. For example, the base station 910 can support 3G, 4G, or other advanced mobile communication networks. The communication device 920 has a wired connection to a wireless router 940 disposed in a building 930. The wireless router 940 can generate a wireless local network (e.g., the Wi-Fi network) to connect to a mobile device. Generally, a combination of the communication device 920 and the wireless router 940 can convert outdoor signals of a mobile communication network into indoor signals of a wireless local network. Accordingly, the invention is suitable for application in some regions where the physical fiber-optic network cannot be easily established (e.g., far or rural regions). Furthermore, since the communication device 920 can automatically select an appropriate beam for signal reception and transmission with the base station 910, the invention can significantly improve the communication quality and reduce the probability of network disconnection.

Note that the above parameters are not limitations of the invention. A designer can fine-tune these settings or values according to different requirements. It should be understood that the antenna control method of the invention is not limited to the configurations of FIGS. 1-9. The invention may merely include any one or more features of any one or more embodiments of FIGS. 1-9. In other words, not all of the features displayed in the figures should be implemented in the antenna control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna control method for controlling an antenna device to switch among a plurality of beams, comprising steps of:
   (a) communicating by using the beams one after another, and performing a scanning process on each of the beams, so as to retrieve a communication quality parameter;
   (b) comparing all of the communication quality parameters with each other, and selecting one of the beams having the best communication quality parameter as a main communication beam;
   (c) performing a saturation determination process on the main communication beam; and
   (d) switching to another beam adjacent to the main communication beam as a substitute communication beam responsive to determining that the main communication beam causes saturation of a power amplifier.

2. The antenna control method as claimed in claim 1, wherein the scanning process of the step (a) comprises:
   measuring a plurality of communication sample values of the corresponding beam at intervals;
   during a preset time period, continuously calculating a plurality of moving average values of the respective communication sample values;
   averaging the moving average values of the respective communication sample values, so as to obtain a plurality of final average values corresponding to the respective communication sample values; and
   using the final average values as the communication quality parameter of the corresponding beam.

3. The antenna control method as claimed in claim 1, wherein each of the communication quality parameters comprises RSRP (Reference Signal Received Power), RSRQ (Reference Signal Received Quality), and SINR (Signal to Interference-plus-Noise Ratio).

4. The antenna control method as claimed in claim 3, wherein the step (b) further comprises:

comparing the RSRP of each of the communication quality parameters with a first threshold value;

responsive to determining that at least one RSRP of the communication quality parameters is not lower than the first threshold value, selecting one of the beams having the best RSRP as the main communication beam; and responsive to determining that all of the RSRPs of the communication quality parameters are lower than the first threshold value, selecting one of the beams having the best RSRQ as the main communication beam.

5. The antenna control method as claimed in claim 3, wherein the saturation determination process of the step (c) comprises:

during a predetermined time period, measuring a plurality of communication sample values of the main communication beam at intervals;

continuously calculating a plurality of moving average values of the communication sample values;

averaging the moving average values, so as to obtain a final average value; and using the final average value as a saturation condition parameter of the main communication beam.

6. The antenna control method as claimed in claim 5, wherein the saturation condition parameter comprises RSRP (Reference Signal Received Power), and SINR (Signal to Interference-plus-Noise Ratio).

7. The antenna control method as claimed in claim 6, wherein the saturation determination process of the step (c) further comprises:

comparing the RSRP of the saturation condition parameter with a second threshold value;

comparing the SINR of the saturation condition parameter with a third threshold value;

responsive to determining that the RSRP of the saturation condition parameter is higher than or equal to the second threshold value, and the SINR of the saturation condition parameter is lower than or equal to the third threshold value, determining that the main communication beam causes the saturation of the power amplifier; and responsive to determining that the RSRP of the saturation condition parameter is lower than the second threshold value, or the SINR of the saturation condition parameter is higher than the third threshold value, determining that the main communication beam does not cause the saturation of the power amplifier.

8. The antenna control method as claimed in claim 1, further comprising:

(e) performing the saturation determination process and a strength determination process on the substitute communication beam.

9. The antenna control method as claimed in claim 8, further comprising:

(f) responsive to determining that a quality measurement for the substitute communication beam is below a predetermined threshold, or causes the saturation of the power amplifier, using the main communication beam again, instead of using the substitute communication beam.

10. The antenna control method as claimed in claim 9, wherein the saturation determination process and the strength determination process of the step (e) comprise:

during a predetermined time period, measuring a plurality of communication sample values of the substitute communication beam at intervals;

continuously calculating a plurality of moving average values of the communication sample values;

averaging the moving average values, so as to obtain a final average value; and using the final average value as a saturation condition parameter and a strength condition parameter of the substitute communication beam.

11. The antenna control method as claimed in claim 10, wherein the saturation condition parameter and the strength condition parameter comprise RSRP (Reference Signal Received Power), and SINR (Signal to Interference-plus-Noise Ratio).

12. The antenna control method as claimed in claim 11, wherein the strength determination process of the step (e) comprises:

comparing the RSRP of the strength condition parameter with a fourth threshold value;

responsive to determining that the RSRP of the strength condition parameter is lower than the fourth threshold value, determining that the substitute communication beam is too weak; and responsive to determining that the RSRP of the strength condition parameter is higher than or equal to the fourth threshold value, determining that the substitute communication beam has sufficient strength.

13. The antenna control method as claimed in claim 11, wherein the saturation determination process of the step (e) further comprises:

comparing the RSRP of the saturation condition parameter with a second threshold value;

comparing the SINR of the saturation condition parameter with a third threshold value;

responsive to determining that the RSRP of the saturation condition parameter is higher than or equal to the second threshold value, and the SINR of the saturation condition parameter is lower than or equal to the third threshold value, determining that the substitute communication beam causes the saturation of the power amplifier; and responsive to determining that the RSRP of the saturation condition parameter is lower than the second threshold value, or the SINR of the saturation condition parameter is higher than the third threshold value, determining that the substitute communication beam does not cause the saturation of the power amplifier.

14. The antenna control method as claimed in claim 9, further comprising:

(g) responsive to determining that the step (c), the step (d), the step (e), and the step (f) have been all completed, during a freezing time period, no switching is performed between the main communication beam and the substitute communication beam.

15. The antenna control method as claimed in claim 14, further comprising:

(h) resetting and then performing the step (a), the step (b), the step (c), the step (d), the step (e), and the step (f) at intervals of a cycle time period.

16. A non-transitory computer-readable medium storing a computer program product operable to control a communication device to perform operations of:

(a) using a plurality of beams of an antenna device for communication one after another, and performing a scanning process on each of the beams, so as to retrieve a communication quality parameter;

(b) comparing all of the communication quality parameters, and selecting one of the beams as a main communication beam, wherein the selected beam has the best communication quality parameter;

(c) performing a saturation determination process on the main communication beam; and
(d) switching to another beam adjacent to the main communication beam as a substitute communication beam responsive to determining that the main communication beam causes saturation of a power amplifier.

* * * * *